United States Patent [19]

Charnock

[11] Patent Number: 4,574,142
[45] Date of Patent: Mar. 4, 1986

[54] CURABLE ADHESIVE COMPOSITION TOUGHENED WITH STYRENE-BUTADIENE BLOCK COPOLYMER RUBBERS

[75] Inventor: Ronald S. Charnock, Celbridge, Ireland

[73] Assignee: Loctite (Ireland) Ltd., Dublin, Ireland

[21] Appl. No.: 659,753

[22] Filed: Oct. 11, 1984

Related U.S. Application Data

[63] Continuation-in-part of Ser. No. 503,073, Jun. 13, 1983, abandoned, which is a continuation of Ser. No. 281,264, Jul. 8, 1981, abandoned.

[30] Foreign Application Priority Data

Jul. 11, 1980 [IE] Ireland .................................. 1449/80

[51] Int. Cl.⁴ ............................................ C08F 279/00
[52] U.S. Cl. ....................................... 525/305; 525/310
[58] Field of Search ........................... 525/93, 305, 310

[56] References Cited

U.S. PATENT DOCUMENTS

| 3,300,547 | 1/1967 | Gorman | 525/285 |
| 3,832,274 | 8/1974 | Owston | 260/42.22 |
| 4,126,504 | 11/1978 | Wolinski et al. | |
| 4,138,449 | 2/1979 | Baldwin | 525/310 |
| 4,243,500 | 1/1981 | Glennon | 525/93 |
| 4,287,317 | 9/1981 | Kitagawa | 525/310 |

FOREIGN PATENT DOCUMENTS 1513427 6/1978 United Kingdom .

Primary Examiner—Paul R. Michl
Attorney, Agent, or Firm—Walter J. Steinkraus; Eugene F. Miller

[57] ABSTRACT

Elastomer toughened two-part acrylic monomer adhesives which employ styrene-butadiene block copolymer rubbers as the elastomer have improved heat resistance properties at temperatures typical of industrial paint bake ovens. The adhesives include: in one part an acrylic monomer, at least 33% by weight of the rubber dissolved in the monomer, and a free radical catalyst system free of organic sulfonyl chloride; and in the other part a polymerization activator such as an amine-aldehyde condensation product.

14 Claims, No Drawings

CURABLE ADHESIVE COMPOSITION TOUGHENED WITH STYRENE-BUTADIENE BLOCK COPOLYMER RUBBERS

CROSS REFERENCE TO PRIOR APPLICATIONS

This application is a continuation-in-part of copending application 503,073, filed June 13, 1983, now abandoned, which is a continuation of Ser. No. 281,264, filed July 8, 1981, now abandoned.

Disclosed in the prior art are adhesive compositions based on solutions of elastomeric polymers in polymerizable vinyl monomers. The compositions usually exhibit reasonably good storage stability and cure rapidly to strong, tough bonds. The compositions cure in the presence of air at room temperature, usually with the aid of various polymerization catalysts; e.g., free-radical generators, initiators, promoters, and accelerators.

Examples of such adhesive compositions can be found in U.S. Pat. Nos. 3,810,407, 3,962,372, 4,112,013, 4,118,436, 3,994,764, 3,832,274, and 4,138,449. Adhesive compositions formulated from these patents have several shortcomings which make then ineffective in applications which involve extreme environmental conditions.

One major disadvantage is their inability to maintain their structural properties such as tensile shear strength, T-peel and impact after significant exposure to high temperature aging. The chlorosulfonated polyethylene, polychloroprene and polyurethane rubber based adhesive compositions are limited, with respect to their maximum useful service, to temperatures less than 110° C. All of these adhesives require the addition of reasonably large amounts of epoxy resins to improve high temperature resistance. However, high temperature improvements in this manner are not always substantial enough to meet the requirements of many high temperature applications, and often are merely temporary.

Recent legislation regarding hazardous organic solvents has focused on the need to replace high volatile monomers with low volatility, high boiling-point monomers. The prior art rubbers (elastomers) are generally not sufficiently soluble in low volatility methyl methacrylate monomers to allow a useful product to be formulated.

It is evident that there is a need for an adhesive composition which when cured, provides excellent bond strengths and exhibits toughness and resistance to environmental conditions, particularly high temperature, for extended periods of time.

The adhesive compositions of this invention are designed to overcome these traditional problems of the prior art.

This invention relates to fast curing, free-radical catalyzed structural adhesives, which forms bonds of high tensile shear strength and high T-peel strength when cured. While it is entirely possible to formulate the invention as a one-part adhesive composition, the adhesive compositions described herein are generally formulated as two-part compositions, the first part comprising at least one polymerizable acrylate ester monomer, and at least one butadiene-styrene block co-polymer rubber soluble in the monomer, an adhesion promoter, and a free radical initiator system; the second part comprising an activator.

More particularly, this invention relates to two-part adhesive compositions of the polymer-in-monomer type, wherein the polymer is dissolved in the monomer, along with the adhesion promoter and the free radical catalyst system. This solution serves as the first part of the adhesive composition. The second part of the composition is an activator, which is usually applied as a primer or coating to a substrate prior to bonding. The polymer-in-monomer solution can either be applied directly over the activated surface of the substrate or on another substrate to be mated with the first. These adhesive compositions are essentially 100% reactive nd do not rely in any way on the loss or evaporation of organic solvents or water to cure.

One advantage of these adhesive compositions is that they exhibit excellent resistance to high temperature heat aging and do not require the addition of large amounts of expensive epoxy resins, as does the prior art. The adhesive compositions retain their high tensile shear strength and high T-peel strengths after exposure to temperatures of up to 180° C. for periods of a week or more. Such improvements are of particular importance in applications which involve high temperature exposure for long period of time; e.g. automobile applications where adhesive bonded car components must withstand paint baking cycles in excess of 150° C. for periods of up to several hours. Equally important is the ability of the instant adhesive compositions to bond to oily, waxy, or otherwise lubricated surfaces without the aid of surface cleaners and without the need to apply an activator to both surfaces to be bonded. This improvement over the prior art is significant in a variety of applications, particularly ones in the automobile industry.

Another object of this invention is to provide an ultra-violet curing, toughened adhesive composition which has resistance to sunlight, UV radiation, adverse weather conditions and solvents.

The invention further provides adhesive compositions that upon cure yield bonds which can withstand high impact shock and peeling forces, at room temperature as well as at temperature extremes. Whereas many of the prior art adhesives were limited to less than 30% by weight of elastomer in order to prevent excessively high viscosities, and thereby resulting in both poor wetting ability and difficult handling, the instant invention is designed to overcome these disadvantages.

The instant adhesive compositions are fast curing, easy to use compositions which exhibit excellent shelf-life stability, and are capable of bonding a wide variety of substrates. When cured, these compositions provide excellent resistance to temperatures ranging from about −40° C. to about 205° C., oils at elevated temperatures (including sulfur bearing types), moisture and humidity, oxidation and ozonation.

The polymerizable acrylate ester monomers may be monofunctional or a combination of mono- and polyfunctional monomers. Generally, the monomers are exemplified but not limited to those selected from the class consisting of alkyl acrylates, cycloalkyl acrylates, alkyl methacrylates, cycloalkyl methacrylates, alkoxy acrylates, alkoxy methacrylates, alkylene diacrylates and alkylene dimethacrylates. Among the preferred monofunctional monomers are methyl methacrylate, lauryl methacrylate, 2-ethyl hexyl methacrylate, ethyl methacrylate, n-butyl methacrylate, iso-butyl methacrylate and t-butyl methacrylate. The most preferred are those monomers which have high boiling points and low volatility characteristics, including such monomers as tetrahydrofurfuryl methacrylate, cyclohexyl methacrylate, isobornyl methacrylate, hydroxyethyl methacrylate and hydroxypropyl methacrylate.

The monofunctional monomers mentioned above may generally be represented by the formula:

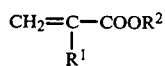

I.

wherein $R^1$ is H, $CH_3$ or lower alkyl, $R_2$ is H, alkyl, alkoxy, cycloalkyl, or alkylene group.

The effective range of the monofunctional polymerizable acrylate ester monomer to be used in the instant compositions may vary somewhat depending on the specific properties desired, but generally about 10 to about 90% by weight of the composition desired, and preferably within the range of about 15 to about 80% by weight, and most preferably about 15 to about 40% by weight of the composition. Adjustments within these ranges are easily made within the skill of the art.

It may be desirable to add a polyfunctional monomer to the composition as well. When this is done, it generally should be in the range of about 1 to about 40% by weight of the composition, depending on the specific polyfunctional monomer. The preferred polyfunctionals are dimethacrylates of various glycols. The monomers are disclosed in U.S. Pat. No. 3,218,305 and are of the general formula:

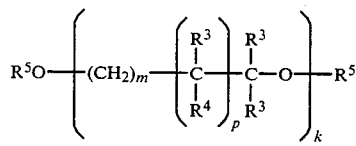

II.

wherein $R^3$ is H, $C_{1-4}$ alkyl or hydroxyalkyl or $R^5OCH_2$—; $R^6$ is $H_5$, halogen or $C_{1-4}$ alkyl; $R^4$ is H, OH or $R^5O$—; $R^5$ is $CH_2=CR^6C=O$—; m is an integer, preferably 1 to 8; k is an integer, preferably 1 to 20; and p is 0 or 1.

Examples of some preferred glycol dimethacrylates of this formula are polyethylene glycol dimethacrylate and dipropylene glycol dimethacrylate, to name a few.

Other suitable polymerizable ester monomers which may be employed are described in U.S. Pat. No. 4,018,851, having the general formula:

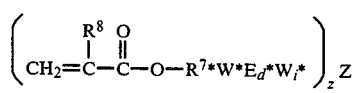

III.

wherein $R^8$ is selected from the class consisting of hydrogen, chlorine, and methyl and ethyl radicals; $R^7$ is bivalent organic radical selected from the group consisting of lower alkylene of 1-8 carbon atoms, phenylene, and naphthylene; W is a polyisocyanate radical; E is an aromatic, heterocyclic or cycloaliphatic polyol or polyamine radical, preferably a diol, and more preferably a diol of a cycloaliphatic compound; d is either 1 or 0; i is 0 when d is 0, and otherwise equal to one less than the number of reactive hydrogen atoms of E; wherein Z is a (i) polymeric or copolymeric grafted alkylene ether polyol radical or (ii) polymeric or copolymeric methylene ether polyol radical; z is an integer equal to the valency of Z; wherein an asterisk indicates a urethane (—NH—CO—O—) or ureide (—NH—CO—NH—) linkage. Z may also be a polymeric or copolymeric methylene ether polyol radical, giving a group of polymerizable monomers disclosed in U.S. Pat. No. 3,993,815.

Monomers generally characterized as polyurethanes or polyureides, as disclosed in U.S. Pat. No. 3,425,988 may also be used effectively. These monomers are formed from the reaction of an organic polyisocyanate and an acrylate ester having an active hydrogen in the non-acrylate portion of the ester. These monomers may be represented by the general formula:

$$(A—X—CO.NH)_nB$$ IV.

wherein X is —O— or —$R^9N$—; $R^9$ is selected from a group consisting of H or lower alkyls of 1 through 7 carbon atoms; A is $CH_2=CR^{10}.CO.O$—; $R^{10}$ is H or $CH_3$; n is an integer from 2 to 6 inclusive; and B is a polyvalent substituted or unsubstituted alkyl, alkenyl, cycloalkyl, aryl, aralkyl, alkyloxy-alkylene, aryloxy-arylene or heterocyclic radical.

Finally, polymerizable urethane-acrylate monomers disclosed in U.S. patent application No. 356,679 to O'Sullivan, filed May 2, 1973, now abandoned, particularly Example 3 thereof, may be employed. Typical monomers of this type have the general formula of:

$$(CH_2=CR^{11}.CO.O.R^{13}.O.CO.NH)_2R^{12}$$ V.

wherein $R^{11}$ is H, $CH_3$, $C_2H_5$ or $Cl$; $R^{12}$ is $C_{2-20}$ alkylene, alkenylene or cycloalkylene radical or a $C_{6-40}$ arylene, alkarylene, aralkarylene, alkyloxyalkylene or aryloxyarylene radical which may be substituted by 1-4 chlorine atoms or by 1-3 amino or mono- or di-$C_{1-3}$ alklamino or $C_{1-3}$ alkoxy groups. $R^{13}$ is one of the following less one hydrogen atom: (a) a $C_{1-8}$ hydroxy alkyl or aminoalkyl group, (b) a $C_{1-6}$ alkylamino-$C_{1-8}$ alkyl group; or (c) a hydroxyphenyl, an aminophenyl, a hydroxynaphthyl or an aminonaphthyl group which may be further substituted by an alkyl, alkylamino or dialkylamino group, each alkyl group in this subpart (c) containing up to about 3 carbon atoms. Of these, the preferred compositions contain either monomer VI., of formula:

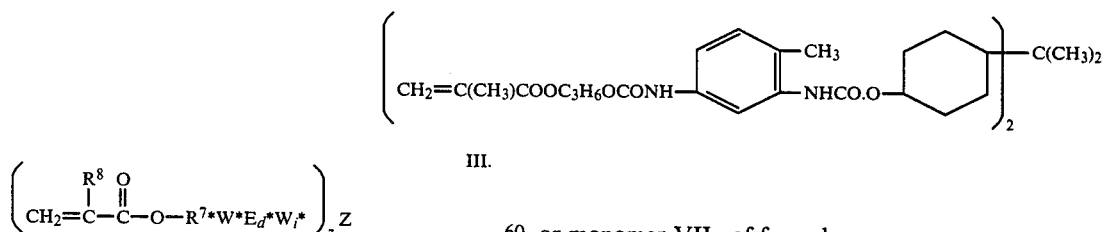

or monomer VII., of formula:

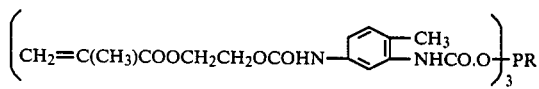

or both, (PR represents a propylene triol oligomer residue).

Mixtures of some or all of the above polymerizable acrylate ester monomers are also helpful.

The rubbers of the instant invention are block copolymers of butadiene-styrene. Among the structures of these copolymers are those represented by (A)n-(B)m, (A-B)n, or (ABA)n, wherein A represents a polystyrene chain and B represents a polybutadiene chain; n and m are integers greater than or equal to one (1) and define the number of repeating units.

The rubbers of the instant composition are generally present in amounts of about 5 to about 80% by weight; and preferably about 25 to about 40% by weight of the composition. The average molecular weight of the rubber preferably should be not less than 5,000, nor greater that a value compatable with the solubility in the chosen monomer. The glass transition temperature of the various block portions are different. The styrene block has a glass transition temperature of 90° C. and the butadiene block has a glass transition temperature of −90° C.

The copolymers of these structures generally contain a functional group at one or both ends or within a particular segment or repeating unit of the copolymer. Among the suitable functional groups are vinyl, epoxy, carboxy, and mercapto groups. Other functional groups may be employed as deemed useful as determined by routine experimentation.

One preferred group of elastomers are the (ABA)n type block copolymers. Several such block copolymers are manufactured by Shell Chemical Company under the tradename Cariflex TR-1000 series. In particular, Cariflex TR-1102, a poly(styrene-b-butadiene-b-styrene) block copolymer, has been found to be especially useful in the instant adhesive composition. Other preferred block copolymers of this type are known under the trade name of Solprene 416, manufactured by Philips Petroleum Co.; and a block copolymer of the trade name Macromer S10BD25MA, manufactured by CPC International Inc.

The adhesion promoters of this invention may be chosen from any of those commonly known to the person reasonably skilled in the art. Two types of promoters are preferred. The first type consists of mono- and dicarboxylic acids which are capable of copolymerizing with the acrylate ester monomer. The preferred species of these classes are methacrylic and acrylic acid. Such acids are used in proportions of 1–20% by weight of the composition, preferably in proportion of 1–15%. The second preferred type of adhesion promoter is of the well-known silane type, present in the composition in proportions of 1–10% by weight of the composition.

The free-radical initiator system consists of a free-radical initiator and an accelerator of free radical polymerization both of which serve to effect rapid polymerization. The free-radical initiators may be of the organic peroxy or hydroperoxy type, perester or peracid type. Especially useful are the perester and peroxide type, among which t-butyl perbenzoate and cumene hydroperoxide are preferred.

Useful free-radical initiators also include those that can be decomposed by the action of heat or UV light to produce free radicals. They also include other redox polymerization catalysts or any compound capable of generating free radicals. Such compounds can easily be selected from those skilled in the art. For a more detailed discussion, see U.S. Pat. Nos. 3,043,820, 3,591,438, 3,616,640, and 3,832,274.

Those free-radical initiators of the photoinitiator type are preferably selected from the group consisting of acetophenones, benzophenones and 1- and 2- acetonaphthones. Additional initiators may be selected from the class consisting of (a) $C_1$ to $C_6$ alkyl diones; (b) methal carbonyls of the formula $M_x(CO)_y$ wherein M is a metal atom, x is 1 or 2, and y is an integer determined by the total valence of the metal atom; and (c) carbonyl compounds of the general formula $R^{14}(CO)R^{15}$ wherein $R^{14}$ is an alkyl, aryl, aralkyl or alkaryl group containing up to about 10 carbon atoms, and $R^{15}$ is $R^{14}$ or hydrogen; or $R^{14}$ and $R^{15}$ taken together with carbonyl group form an aromatic or heterocyclic ketone containing up to about 16 carbon atoms.

The initiators are usually employed in amounts of about 1% to about 10% by weight of the composition.

The accelerators of free-radical polymerization of the above-mentioned catalyst system are generally used with good results in concentrations of less than 10% by weight, the preferred range being about 0.1% to about 0.75%. Sulfimides are the preferred group of free-radical accelerators, with the preferred species being 3-oxy-2,3-dihydrobenz[d]isothiazole-1,1-dioxide, comonly known as benzoic sulfimide or saccharin. Tertiary amines may also be employed as accelerators for free-radical production with the preferred amine being N,N-dimethyl-paratoluidine.

The final essential ingredient in the instant adhesive composition is an activator, which generally comprises the second part of the adhesive composition, the first part being the curable portion of the composition. These activators are intended to be applied on the surface of a substrate to be bonded, usually as a coating or a primer prior to application of the first part of the adhesive composition. However, it is also feasible for the curable portion of the composition to be put on a substrate and the activator applied over it. The preferred activators are generally aldehyde-amine condensation products, the preferred being butyraldehyde-aniline. Activators of the type are sold commercially by Uniroyal under the name Beutene, or by DuPont under the name DuPont 808. The condensation products are usually in a solvent solution such at trichloroethane, or similar solvents, for easy application.

In another embodiment, a two-part composition is contemplated wherein each part has a polymerizable portion of the adhesive composition, and wherein one part contains the free-radical initiator and the accelerator of free-radical polymerization, and the other part contains the activator.

It is optional, but recommended, that chelators, cross-linking agents, and inhibitors be present in the adhesive composition for optimum performance. Chelators and inhibitors are effective in amounts of about 0.1 to about 1% by weight of the composition. Ethylenediamine tetra-acetic acid and its sodium salt (NaEDTA), 2,2-ethylenebis-nitril methylidyne dipyridine and the class of beta-diketones are generally the most effective and are preferred. Cross-linking agents, optionally present in amounts from about zero to about 10% by weight of the composition, include such compounds as copolymerizable dimethacrylates.

The inhibitor concentration left over in the monomers from manufacture is often high enough for good stability. However, to insure maximum shelf life, the proportions mentioned above (about 0.1 to about 1% by weight of the composition) are recommended. Of those inhibitors which have been found of adequate utility is the group consisting of hydroquinones, benzoquinones, naphthoquinones, phenanthraquinones, anthraquinones, and substituted compounds of any of the foregoing. Additionally, various phenols can be employed as inhibitors, the preferred one being 2,6-di-tert-butyl-4-methyl phenol.

The amount of thickness, viscosity, or thixotropy desired can be varied in accordance with the particular application required. Thickeners, plasticizers, diluents, and various other agents common to the art can be employed in any reasonable manner to produce the desired characteristics.

The invention will be appreciated further-from the examples to follow, which are not meant in any way to restrict effective scope of the invention.

EXAMPLES

Example 1

TABLE 1

| Ingredients | 1 | 2 | 3 (control) |
|---|---|---|---|
| | Percent by Weight | | |
| Cariflex TR-1102 (poly-butadiene styrene block copolymer) | 36.8 | 30.0 | — |
| methyl methacrylate | 48.3 | — | 46.0 |
| cyclohexyl methacrylate | — | 55.5 | — |
| butylene glycol dimethacrylate | 2.0 | 2.0 | 2.0 |
| methacrylic acid | 10.5 | 10.0 | 10.0 |
| t-butyl perbenzoate | 2.0 | 2.0 | 2.0 |
| saccharin | 0.5 | 0.5 | 0.5 |
| Elvacite 2009 (poly-methylmethacrylate) | — | — | 40.0 |
| *Tensile Shear Strength (psi) | 3427 | 3817 | 4857 |
| **T-peel Strength (pli) | 23 | 30 | 6 |

*Tested according to ASTH D1002-64; tested at room temperature;
**Tested according to ASTM D1876-69; tested at room temperature;

The methacrylate and dimethacrylate resins shown in Table 1 are monomers. The methacrylic acid is an adhesion promoter. The initiator system is represented by the perester free-radical initiator, t-butyl perbenzoate, and the accelerator of free-radical polymerization, saccharin. Elvacite 2009 is a trade name for polymethyl methacrylate which was added to the control to increase the viscosity to a satisfactory value.

Test samples for the tensile shear and T-peel tests were prepared from grit-blasted steel and grit-blasted aluminum respectively. The grit-blasted surfaces were cleaned with a chlorinated solvent and coated with an amine-aldehyde activator sold by the Uniroyal Co. under the trade name Beutene. All samples corresponding to the data in Table 1 were cured at room temperature for 72 hours prior to testing, which was also conducted at room temperature.

Table 1 shows two examples of formulations of the instant invention (1 and 2), and a third formulation, which is a control. As the test data in the table indicates, the adhesive composition which contains the Cariflex TR-1102 rubber (styrene-b-butadiene-b-styrene) exhibit remarkable T-peel strenghts when compared with those without the rubber. The addition of the block copolymer rubbers also exhibits good tensile shear strength notwithstanding the large amounts of rubber added.

Example 2

Test samples were prepared as in Example 1 and the data shown below was collected. All test samples were coated with the activator Beutane except those test samples used for the control formulation (6), which used the amine-aldehyde activator DuPont 808.

TABLE 2

| Ingredients | FORMULATION NO. | | |
|---|---|---|---|
| | 4 | 5 | 6 (control) |
| | Percent by Weight | | |
| Hypalon 20 | — | — | 35.0 |
| Cariflex TR-1102 | 36.8 | — | — |
| Solprene 416 | — | 35.0 | — |
| Methyl Methacrylate | 48.3 | 51.0 | 48.25 |
| Butylene glycol dimethacrylate | 2.0 | 2.0 | 1.0 |
| Methacrylic acid | 10.5 | 10.0 | 10.0 |
| t-butyl perbenzoate | 2.0 | 2.0 | — |
| saccharin | 0.5 | 0.5 | — |
| Cumen hydroperoxide | — | — | 0.5 |
| Stabilizer (2,6-di-tert-butyl-4-methyl-phenol) | — | — | 0.25 |
| *Tensile Shear Strength (psi) | | | |
| initial - rm temp. cure for 72 hrs. | 3941 | 3565 | 4347 |
| final - tested at rm temp. after 7 days exposure to 180° C. | 4897 | 4579 | 1550 |
| **T-peel strength (pli) | | | |
| initial - rm temp. cure for 72 hrs. | 26 | 30 | 28 |
| final - tested at rm temp. after 7 days exposure to 180° C. | 37 | 31 | 9 |

*Tested according to ASTM D1002;
**Tested according to ASTM D1876-69T.

Hypalon 20 is manufactured by E. I. DuPont DeNemours & Co., and is the trade name for a chlorosulfonated polyethylene rubber well-known in he prior art. Epon 828 is a trade name for an epoxy additive manufactured by Shell Chemical Co., and used to increase heat resistance in the prior art rubber toughened adhesive composition. Cumene Hydroperoxide serves as a free radical initiator. Solprene 416 is a trade name for a butadiene-styrene block copolymer manufactured by the Phillips Petroleum Co. All other compounds listed are described in Example 1.

As the table indicates, the compositions of the instant invention 4 and 5, exhibit significantly improved resistance to high temperatures over the prior art composition 6. The test results show the inventive compositions do not merely retain their strength and toughness at elevated temperatures, but exhibit an improvement in those properties after exposure.

Example 3

Test samples were prepared as in the previous examples. Formulations 7 and 8 were coated with the activator Beutene, and the control formulations 9 and 10 were coated with the DuPont 808 activator.

This example demonstrates that the addition of the rubbers of the instant invention has the advantage of increasing toughness and heat resistance without the disadvantage of excessively increasing the viscosity of the adhesive composition, particularly when significant quantities (greater than 30% by weight) of the rubber are added.

TABLE 3

| Ingredients | FORMULATION NO. | | | |
|---|---|---|---|---|
| | 7 | 8 | 9 (control) | 10 (control) |
| | Percent by weight | | | |
| Solprene 416 | 35.0 | — | — | — |
| Macromer S10BD25MA | — | 33.0 | — | — |
| Hypalon 20 | — | — | 40.0 | — |

TABLE 3-continued

| | FORMULATION NO. | | | |
|---|---|---|---|---|
| | 7 | 8 | 9 (control) | 10 (control) |
| Ingredients | Percent by weight | | | |
| Breon 1001 | — | — | — | 30.0 |
| Methyl Methacrylate | 51.0 | 50.0 | 43.5 | 55.5 |
| Butylene Glycol Dimethacrylate | 2.0 | 2.0 | 1.0 | 2.0 |
| Methacrylic Acid | 10.0 | 11.0 | 9.8 | 10.0 |
| t-butyl Perbenzoate | 2.0 | 2.0 | — | 2.0 |
| Saccharin | 0.5 | 0.5 | — | 0.5 |
| Cumen Hydroperoxide | — | — | 0.5 | — |
| Epon | — | 3.8 | 4.9 | — |
| Stabilizer (2,6-di-tert-butyl-4-methyphenol) | — | — | 0.25 | — |
| Viscosity (poise) | | | | |
| Measured on RVT Brookfield Viscometer at 20 rpm., at 20° C. | 260 | 220 | 1980 | 72,000 |
| T-peel strength (pli) measured according to ASTM D1876-69T | 30 | 30 | 35 | 26 |

Formulations 7 and 8 are embodiments of the instant invention, using the butadiene-styrene block copolymers of the trade names Solprene 416 and Macromer S10BD25MA, respectively. Formulation 9 uses Hypalon 20, a well-known chlorosulfonated polyethylene rubber, and is a control. Breon 1001 is a poly(butadiene-acrylonitrile) rubber of the prior art and is also a control. The remainder of the compounds listed are described in the previous examples.

It will be noted that the inventive formulations in Examples 1-3 do not include any sulfonyl chloride compound additives. Adhesive bonds formed from the prior chlorosulfonated polyethylene containing formulations, such as control formulation 6 in Table 2 above, are thought to exhibit poor heat stability because of elevated temperature degradation of the chlorosulfonyl groups and resulting attack by HCl on the cured polymer. Accordingly, other compounds containing chlorosulfonyl groups should likewise be avoided in the inventive compositions. In U.K. patent specification No. 1,513,427 there are described polymer-in-monomer type adhesives cured with aminealdehyde products and which include organic sulfonyl chloride compounds as part of the cure system. Exemplified toughening polymers include a styrenebutadiene block copolymer. The negative impact on heat resistance of such sulfonyl chloride containing compounds is demonstrated by Example 4.

Example 4

Formulations were made up as follows:

| Ingredient | A | B |
|---|---|---|
| Solprene TM 416 Block SBS Rubber | 33 | 33 |
| Methyl Methacrylate | 59.5 | 59.5 |
| Methacrylic Acid | 7.5 | 7.5 |
| Cumene Hydroperoxide | 0.33 | 0.33 |
| Toluene-4-Sulphonyl Chloride | 1.49 | 0 |

Standard grit blasted mild steel coupons, 1"×3", were bonded with the two formulations in the standard lap shear manner using DuPont 808 TM as an activator applied to one substrate and wiped with a cotton swab to give a thin film. The adhesive was applied to the other substrate. The following strengths were obtained:

| Test | Formulation | |
|---|---|---|
| | A | B |
| Tensile Shear Strength, daN/CM² Cure for 24 hours at room temp. | 106.2 | 58.9 |
| Cure for 24 hours at room temp. then 30 mins. at 185° C. | 52.4 | 88.5 |
| Pecent change due to bake exposure | −50.6 | +50.2 |

From the foregoing, it can be seen that the initial strength of formulation B, without sulphonyl chloride, is lower and that strength retention after heat exposure during paint bake is significantly better.

I claim:

1. A curable composition produced by mixing or contacting an activator component with a polymerizable component, the composition characterized in that it consists of said activator and said polymerizable components; said activator and polymerizable components are intermixed or in contact with each other so as to form an activated composition; both said components of said activated composition are free of organic sulfonyl chloride compounds; and said polymerizable component comprises a polymerizable acrylic ester monomer, at least 33% by weight of a styrene-butadiene block copolymer rubber, an adhesion promoter and a free radical catalyst system comprising a free radical initiator.

2. The composition of claim 1 wherein said block copolymer is present in an amount of about 33% to about 40% by weight of the composition.

3. The composition of claim 1 wherein the block copolymer is present in an amount in excess of 35% by weight of the composition.

4. An epoxide resin-free composition as in claim 1.

5. The composition of claim 1 wherein the adhesion promoter is acrylic or methacrylic acid.

6. The composition of claim 1 wherein the adhesion promoter is a silane.

7. The composition of claim 1 wherein the activator is an amine-aldehyde condensation product.

8. The composition of claim 7 wherein the activator is a condensation product of butyraldehyde and aniline.

9. The composition as in claim 1 wherein said polymerizable monomer component includes at least one member of the group consisting of methyl methacrylate, lauryl methacrylate, 2-ethylhexyl methacrylate, ethyl methacrylate, n-, t-, or isobutyl methacrylate, tetrahydrofurfuryl methacrylate, cyclohexyl methacrylate, isobornyl methacrylate, hydroxyethyl methacrylate, hydroxypropyl methacrylate, butylene glycol dimethacrylate, polyethylene glycol dimethacrylate and dipropylene glycol dimethacrylate.

10. The composition of claim 1 wherein said polymerizable acrylate ester monomer component comprises a mixture of monofunctional and polyfunctional acrylate or methacrylate ester monomers.

11. The adhesive of claim 10 wherein the adhesion promoter is selected from acrylic and methacrylic acid, the activator is an amine aldehyde condensation product and said styrene-butadiene block copolymer is present in the range of 33–40% by weight of the composition.

12. The composition of claim 11 wherein the free radical initiator is selected from organic peroxides, hydroperoxides, peresters and peracids.

13. The composition of claim 12 wherein the said polymerizable component further comprises an accelerator selected from sulfimides and tertiary amines.

14. The composition of claim 1 wherein said activator component is an initiator-free composition comprising a polymerizable acrylic monomer and an activator.

* * * * *